United States Patent
O'Reilly, Jr. et al.

(10) Patent No.: US 12,008,350 B2
(45) Date of Patent: Jun. 11, 2024

(54) SYSTEM AND METHOD FOR FAST APPLICATION INITIALIZATION WITH DEFERRED INJECTION

(71) Applicant: EMC IP Holding Company, LLC, Hopkinton, MA (US)

(72) Inventors: Daniel K. O'Reilly, Jr., Framingham, MA (US); Evgeniy Kirichenko, Saint Petersburg (RU)

(73) Assignee: EMC IP Holding Company, LLC, Hopkinton, MA (US)

( * ) Notice: Subject to any disclaimer, the term of this patent is extended or adjusted under 35 U.S.C. 154(b) by 153 days.

(21) Appl. No.: 17/507,879

(22) Filed: Oct. 22, 2021

(65) Prior Publication Data
US 2023/0125207 A1  Apr. 27, 2023

(51) Int. Cl.
*G06F 8/41* (2018.01)
*G06F 8/20* (2018.01)
*G06F 8/61* (2018.01)
*G06F 8/75* (2018.01)

(52) U.S. Cl.
CPC ........... *G06F 8/433* (2013.01); *G06F 8/24* (2013.01); *G06F 8/61* (2013.01); *G06F 8/75* (2013.01)

(58) Field of Classification Search
CPC ... G06F 8/433; G06F 8/24; G06F 8/61; G06F 8/75
See application file for complete search history.

(56) References Cited

U.S. PATENT DOCUMENTS

| | | | | |
|---|---|---|---|---|
| 11,163,559 B1 * | 11/2021 | Samuel | ..................... | G06F 8/71 |
| 2007/0240143 A1 * | 10/2007 | Guminy | .................... | G06F 8/70 |
| | | | | 717/168 |
| 2014/0012847 A1 * | 1/2014 | Barnes, II | ................. | G06F 8/75 |
| | | | | 707/E17.046 |
| 2022/0171630 A1 * | 6/2022 | Dang | .................... | G06F 9/5038 |

FOREIGN PATENT DOCUMENTS

| | | | | |
|---|---|---|---|---|
| CN | 102782673 B | * | 8/2015 | ........... G06F 16/214 |
| EP | 4134918 A1 | * | 2/2023 | ............ B25J 9/1666 |

OTHER PUBLICATIONS

Athey et al. "CN 102782673B" (Year: 2015).*
Ohnuki Haruna "EP 4134918 A1" (Year: 2021).*

* cited by examiner

*Primary Examiner* — Ziaul A Chowdhury
(74) *Attorney, Agent, or Firm* — Brian J. Colandreo; Heath M. Sargeant; Holland & Knight LLP (57) ABSTRACT

A method, computer program product, and computing system for defining, a plurality of dependency groups for one or more objects of an application, wherein at least two dependency groups of the plurality of dependency groups include one or more common objects. One or more injectors associated with the one or more common objects may be identified. A first dependency group with at least one common object of the one or more common objects may be processed. For each common object of the first dependency group, a reference to an injector associated with the respective common object from a different dependency group may be generated for deferred processing of the respective common object.

12 Claims, 7 Drawing Sheets

SYSTEM AND METHOD FOR FAST APPLICATION INITIALIZATION WITH DEFERRED INJECTION

BACKGROUND

Storing and safeguarding electronic content may be beneficial in modern business and elsewhere. Accordingly, various methodologies may be employed to protect and distribute such electronic content.

In object-oriented software systems, an application can be viewed as an interconnected graph of objects, where any given object may depend on one or more other objects. Building and instantiating the object dependency graph is a complex, tedious, and error-prone process, particularly in a large piece of software. Dependency Injection frameworks may be utilized to help simplify this. These frameworks provide facilities for declaring how a particular object should be constructed, which the framework then processes and uses to create a special "container" or "injector" class that can then be used to create an instance of any object described in the graph, including creating its entire dependency hierarchy.

Dependency Injection frameworks greatly simplify the application bootstrap process. However, there are some trade-offs with using them. In particular when using a reflection-based framework, the Dependency Injection framework needs to build the entire object graph at the point they are initialized (typically during application startup), in order to validate that there are no objects in the graph that the framework is not actually able to construct. While this is good for validation purposes, it is costly in terms of performance; as it can take several seconds to build a complex graph.

SUMMARY OF DISCLOSURE

In one example implementation, a computer-implemented method executed on a computing device may include, but is not limited to, defining, a plurality of dependency groups for one or more objects of an application, wherein at least two dependency groups of the plurality of dependency groups include one or more common objects. One or more injectors associated with the one or more common objects may be identified. A first dependency group with at least one common object of the one or more common objects may be processed. For each common object of the first dependency group, a reference to an injector associated with the respective common object from a different dependency group may be generated for deferred processing of the respective common object.

One or more of the following example features may be included. An injector map may be generated with the one or more injectors associated with the one or more common objects. A second dependency group may be processed subsequently to the processing of the first dependency group. Processing a first dependency group with at least one common object of the one or more common objects may include generating a dependency graph for the first dependency group. Generating a reference to an injector associated with the respective common object of a different dependency group for deferred processing of the respective common object may include generating the dependency graph for the at least one common object when processing the second dependency group with the at least one common object. Processing a first dependency group with at least one common object of the one or more common objects may include instantiating the one or more objects associated with the first dependency group. Processing a first dependency group with at least one common object of the one or more common objects may include instantiating the at least one common object when processing the second dependency group with the at least one common object.

In another example implementation, a computer program product resides on a computer readable medium that has a plurality of instructions stored on it. When executed by a processor, the instructions cause the processor to perform operations that may include, but are not limited to, defining, a plurality of dependency groups for one or more objects of an application, wherein at least two dependency groups of the plurality of dependency groups include one or more common objects. One or more injectors associated with the one or more common objects may be identified. A first dependency group with at least one common object of the one or more common objects may be processed. For each common object of the first dependency group, a reference to an injector associated with the respective common object from a different dependency group may be generated for deferred processing of the respective common object.

One or more of the following example features may be included. An injector map may be generated with the one or more injectors associated with the one or more common objects. A second dependency group may be processed subsequently to the processing of the first dependency group. Processing a first dependency group with at least one common object of the one or more common objects may include generating a dependency graph for the first dependency group. Generating a reference to an injector associated with the respective common object of a different dependency group for deferred processing of the respective common object may include generating the dependency graph for the at least one common object when processing the second dependency group with the at least one common object. Processing a first dependency group with at least one common object of the one or more common objects may include instantiating the one or more objects associated with the first dependency group. Processing a first dependency group with at least one common object of the one or more common objects may include instantiating the at least one common object when processing the second dependency group with the at least one common object.

In another example implementation, a computing system includes at least one processor and at least one memory architecture coupled with the at least one processor, wherein the at least one processor is configured to define, a plurality of dependency groups for one or more objects of an application, wherein at least two dependency groups of the plurality of dependency groups include one or more common objects. One or more injectors associated with the one or more common objects may be identified. A first dependency group with at least one common object of the one or more common objects may be processed. For each common object of the first dependency group, a reference to an injector associated with the respective common object from a different dependency group may be generated for deferred processing of the respective common object.

One or more of the following example features may be included. An injector map may be generated with the one or more injectors associated with the one or more common objects. A second dependency group may be processed subsequently to the processing of the first dependency group. Processing a first dependency group with at least one common object of the one or more common objects may include generating a dependency graph for the first dependency group. Generating a reference to an injector associated with the respective common object of a different dependency group for deferred processing of the respective common object may include generating the dependency graph for the at least one common object when processing the second dependency group with the at least one common object. Processing a first dependency group with at least one common object of the one or more common objects may include instantiating the one or more objects associated with the first dependency group. Processing a first dependency group with at least one common object of the one or more common objects may include instantiating the at least one common object when processing the second dependency group with the at least one common object.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
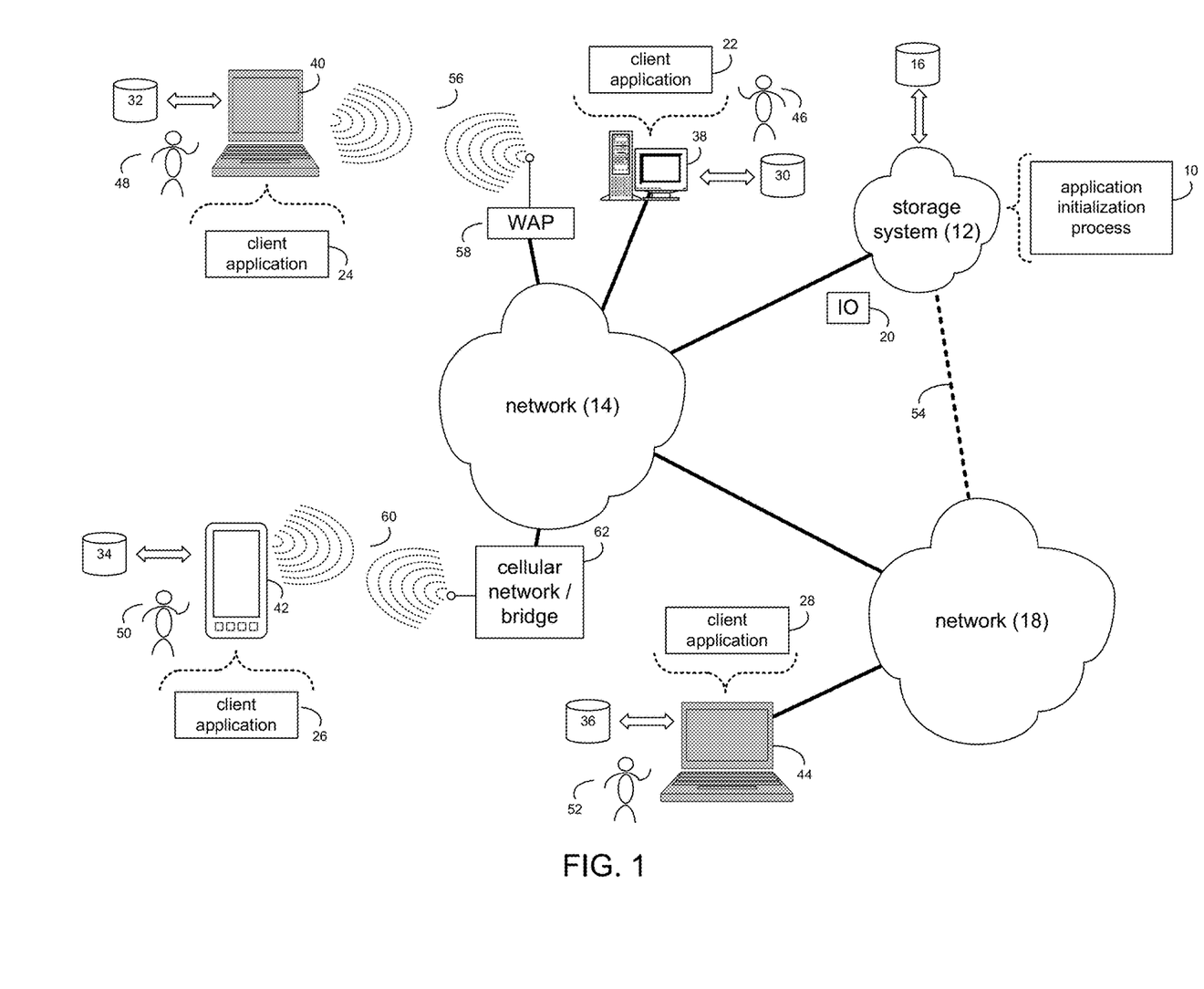
FIG. 1 is an example diagrammatic view of a storage system and an application initialization process coupled to a distributed computing network according to one or more example implementations of the disclosure.

System Overview:

Referring to FIG. 1, there is shown application initialization process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of application initialization process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of application initialization process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, an application initialization process, such as application initialization process 10 of FIG. 1, may include but is not limited to, defining, a plurality of dependency groups for one or more objects of an application, wherein at least two dependency groups of the plurality of dependency groups include one or more common objects. One or more injectors associated with the one or more common objects may be identified. A first dependency group with at least one common object of the one or more common objects may be processed. For each common object of the first dependency group, a reference to an injector associated with the respective common object from a different dependency group may be generated for deferred processing of the respective common object.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
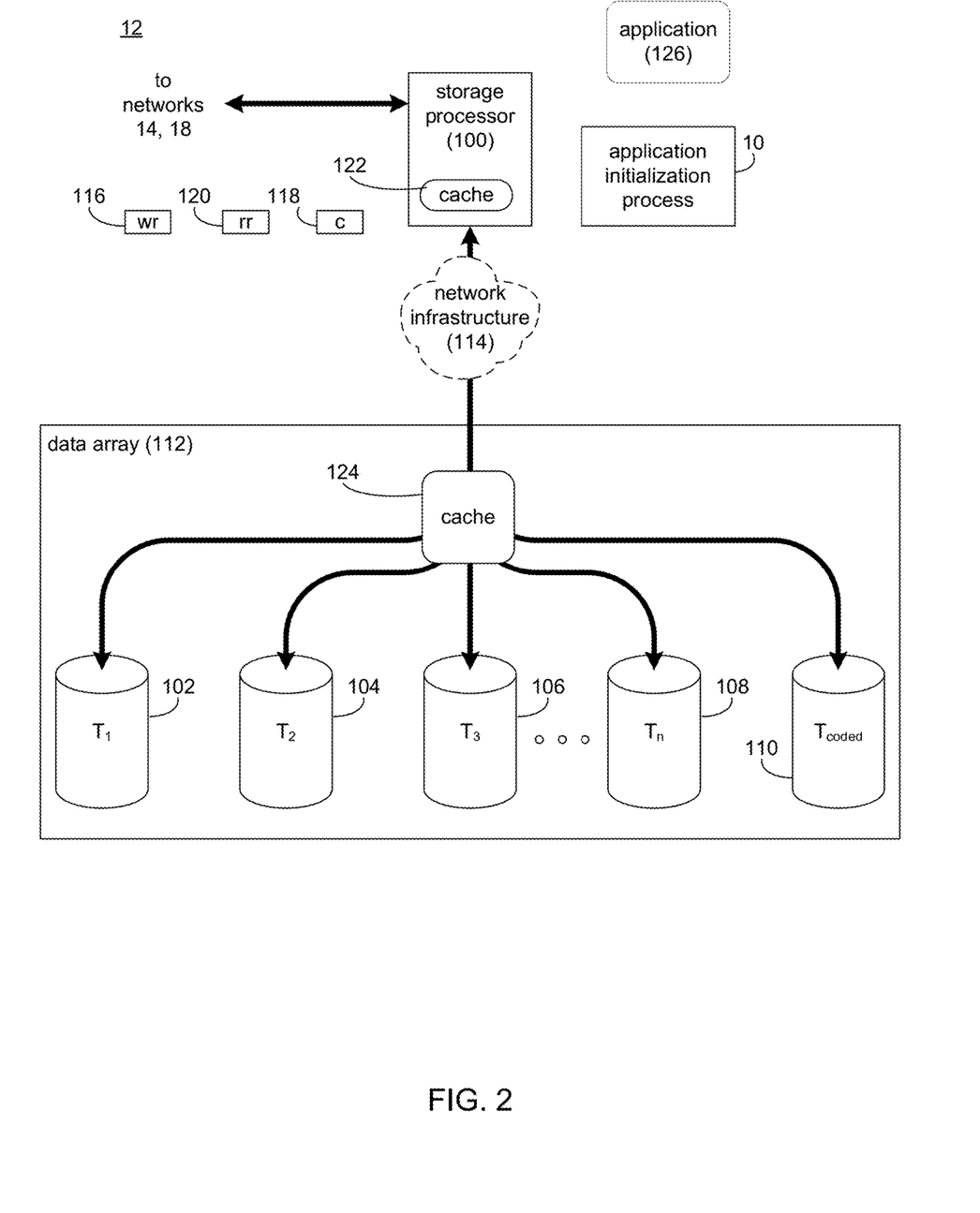
FIG. 2 is an example diagrammatic view of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of application initialization process 10. The instruction sets and subroutines of application initialization process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of application initialization process 10 may be stored on storage devices (and/or executed by processors and memory architectures) that are external to storage system 12.

As discussed above, various TO requests (e.g. TO request 20) may be generated. For example, these TO requests may be sent from client applications 22, 24, 26, 28 to storage system 12. Additionally/alternatively and when storage processor 100 is configured as an application server, these TO requests may be internally generated within storage processor 100. Examples of TO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of application initialization process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of application initialization process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

The Application Initialization Process:

Referring also to the examples of FIGS. 3-7 and in some implementations, application initialization process 10 may define 300, a plurality of dependency groups for one or more objects of an application, wherein at least two dependency groups of the plurality of dependency groups include one or more common objects. One or more injectors associated with the one or more common objects may be identified 302. A first dependency group with at least one common object of the one or more common objects may be processed 304. For each common object of the first dependency group, a reference to an injector associated with the respective common object from a different dependency group may be generated 306 for deferred processing of the respective common object.

As will be discussed in greater detail below, implementations of the present disclosure may allow for the organization of objects of an application into dependency groups and the execution of particular dependency groups to allow more efficient and more prompt application initialization. As discussed above in object-oriented software systems, an application may be viewed as an interconnected graph of objects, where any given object may depend on one or more other objects. Building and instantiating the object dependency graph is a complex, tedious, and error-prone process, particularly in a large piece of software. Dependency Injection frameworks may be utilized to help simplify this. These frameworks provide facilities for declaring how a particular object should be constructed, which the framework then processes and uses to create a special "container" or "injector" class that can then be used to create an instance of any object described in the graph, including creating its entire dependency hierarchy.

Dependency Injection (DI) frameworks greatly simplify the application bootstrap process. However, there are some trade-offs with using them. In particular when using a reflection-based framework, the DI framework builds the entire object graph at the point they are initialized (typically during application startup), in order to validate that there are no objects in the graph that the framework is not actually able to construct. While this is good for validation purposes, it is costly in terms of performance; as it can take several seconds to build a complex graph. In some applications, it is desirable to only partially construct the dependency graph, instantiate some subset of the managed objects and initialize some portion of the application, and then construct the rest of the graph and instantiate the rest of the application. Doing this enables key pieces of functionality to start up faster, without needing to wait for less performance sensitive portions of the application to be processed by the DI framework. However, this is not natively supported by DI frameworks.

It may also be desirable to initialize an object or service that depends on parts of the dependency graph that won't be available at the time it needs to be initialized. During the period where the dependency is not available, it simply won't use that functionality, but once it is available, it should be able to seamlessly start using it. Again, this is not supported by conventional DI frameworks.

The present disclosure leverages components of reflection-based DI frameworks to enable building pieces of the dependency graph at a time, and additionally support instantiating objects that depend on objects that cannot actually be created yet, because it has not yet been graphed by the DI framework. As will be discussed in greater detail below, application initialization process 10 may introduce "dependency groups", to break up the application into mostly independent deployable units, and may leverage features of DI frameworks to build the object graph and instantiate managed objects for each group sequentially, enabling higher priority subsets of an application to start faster. Application initialization process 10 may also defer injection of certain dependencies, so that an object associated with a high-priority group can depend on an object that is associated with a lower-priority group, without compromising the higher-priority group's startup time.

Reflection-based DI frameworks typically provide a way to specify how the framework can define or instantiate an instance of a given class. For example, DI frameworks may use XML, or classes written in the native programming language. These descriptions of how to define or instantiate a particular class or component of an application are typically referred to as modules. In a module, "bindings" of a class or interface to a particular implementation may be defined. These bindings can also be "scoped". For example, it may be specified that only a single instance of a particular class should ever be created, no matter how many times it is requested.

A reflection-based DI framework may include a class that takes a set of modules as an input, builds an object graph from them, and provides an application programming interface (API) for creating instances of arbitrary classes. This may be referred to as an injector, or an object graph. A reflection-based DI framework may support creating child injectors from an existing injector. This may be useful because once an injector is created, the injector may not be changed by adding new modules. As such, if there is a need to add in new modules, a child injector may be created by passing the new modules to the child injector when it is created. Child injectors may share "bindings" created in their parent(s). So if a parent module specifies that the class "Foo" should be scoped to only ever create one instance, both the parent and all its children will share that single instance.

As will be discussed in greater detail below, a reflection-based DI framework may support "lazy injection" (i.e., rather than directly injecting a dependency into an object, a "factory class" may be injected which will actually create the object only when a method calls on the factory class). DI frameworks can automatically generate these factory classes, but the factory classes may be provided with particular modules to generate. DI frameworks may expect to know how to create the dependency at the time the factory class is injected, even though the factory class may defer the actual instantiation of any objects or modules.

Figure 3:
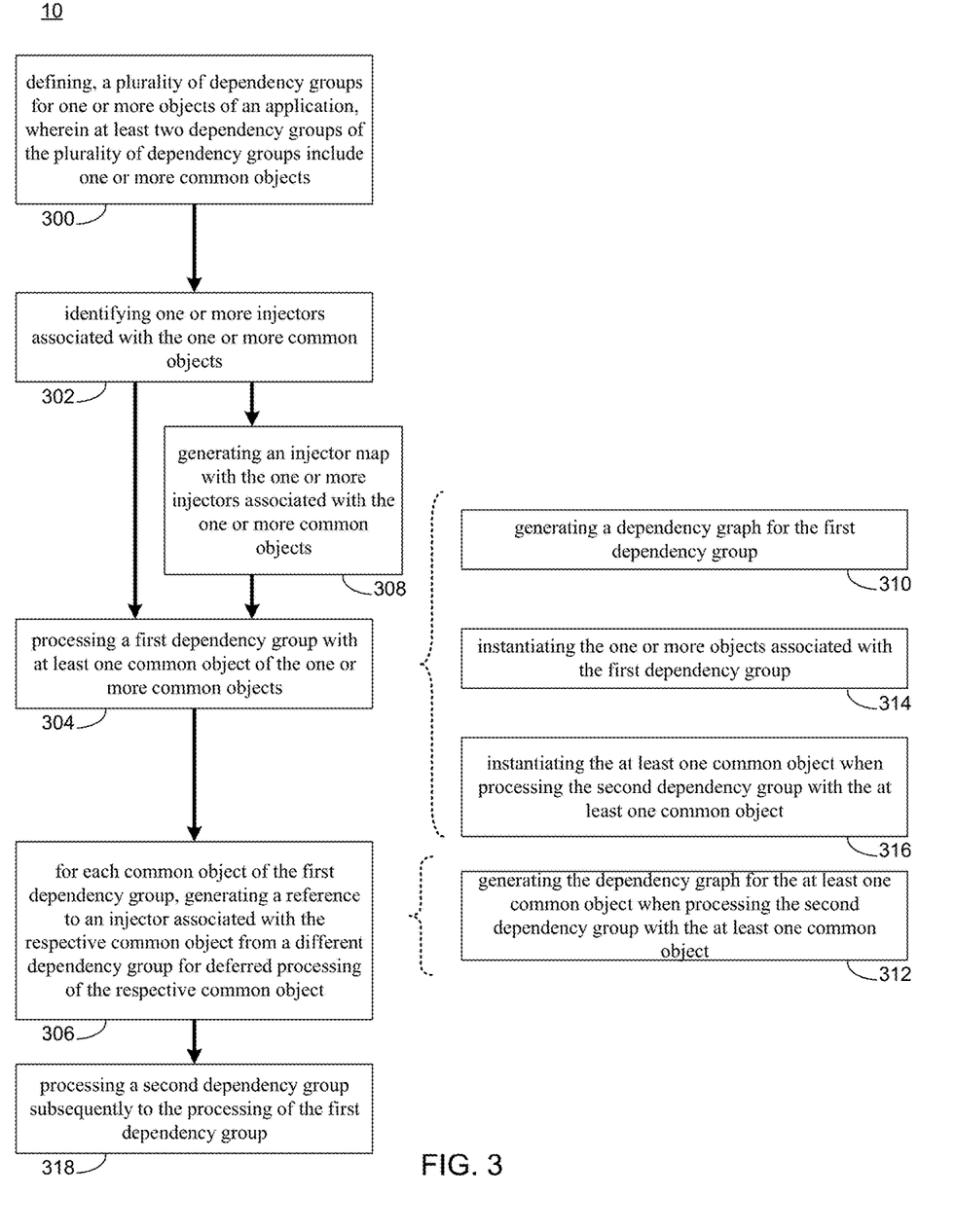
FIG. 3 is an example flowchart of application initialization process according to one or more example implementations of the disclosure.

In some implementations, application initialization process 10 may define 300, a plurality of dependency groups for one or more objects of an application, wherein at least two dependency groups of the plurality of dependency groups include one or more common objects. For example, application initialization process 10 may allow a user to define (e.g., via a user interface) one or more objects of an application. An object may generally refer to portion or service of an application configured to perform a particular task or set of tasks. To instantiate an object, various modules may be utilized. A module may generally include a description of how to define or instantiate a particular object of an application. For example, a module may describe how an injector may instantiate an object. Application initialization process 10 may determine a mapping of particular functions of an application to the one or more objects and to a plurality of modules configured to instantiate the one or more objects. In some implementations, application initialization process 10 may allow a user to define 300 the plurality of dependency group based upon, at least in part, the particular functions of the application. For example, application initialization process 10 may receive, via a user interface, a selection of particular objects of the one or more objects to define the plurality of dependency groups.

Figure 4:
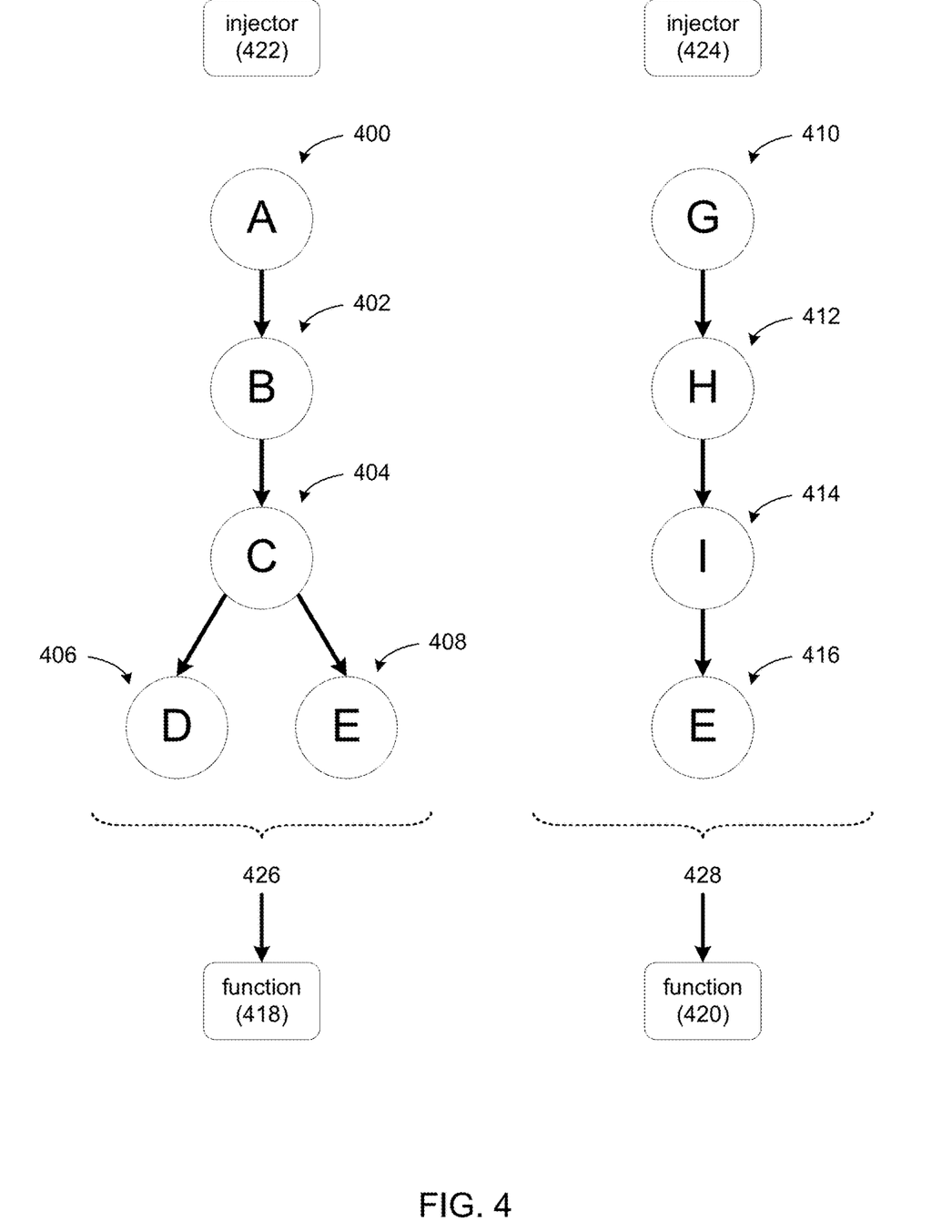
FIGS. 4-7 are example diagrammatic views of a plurality of modules defined in a plurality of dependency groups according to one or more example implementations of the disclosure.

Referring also to FIG. 4, an application (e.g., application 126) may include a plurality of objects (e.g., objects A, B, C, D, E, F, G, and H). These objects may be instantiated using various modules (e.g., modules 400, 402, 404, 406, 408, 410, 412, 414, 416). In this example, the plurality of objects (e.g., objects A, B, C, D, E, F, G, and H) may map to particular functions of the application (e.g., application 126). For example, objects A, B, C, D, and E may be configured to support various functions of the application (e.g., application 126) and may be instantiated with modules 400, 402, 404, 406, 408, 410, 412, 414, 416 respectively. In this example, application initialization process 10 may define e.g., two functions (e.g., functions 418, 420). Suppose that the first function (e.g., function 418) is used for initialization of an application while the second function (e.g., function 420) is used for processing data within the application. As shown in the example of FIG. 4, function 418 may include modules 400, 402, 404, 406, 408 configured to instantiate objects of function 418 (e.g., objects A, B, C, D, and E) using injector 420 while function 418 may include modules 410, 412, 414, 416 configured to instantiate objects of function 420 (e.g., objects G, H, I, and E) using injector 424. While an example of e.g., two functions has been described, it will be appreciated that this is for example purposes only and that any number of functions and any number of corresponding modules may be defined within the scope of the present disclosure.

Figure 5:
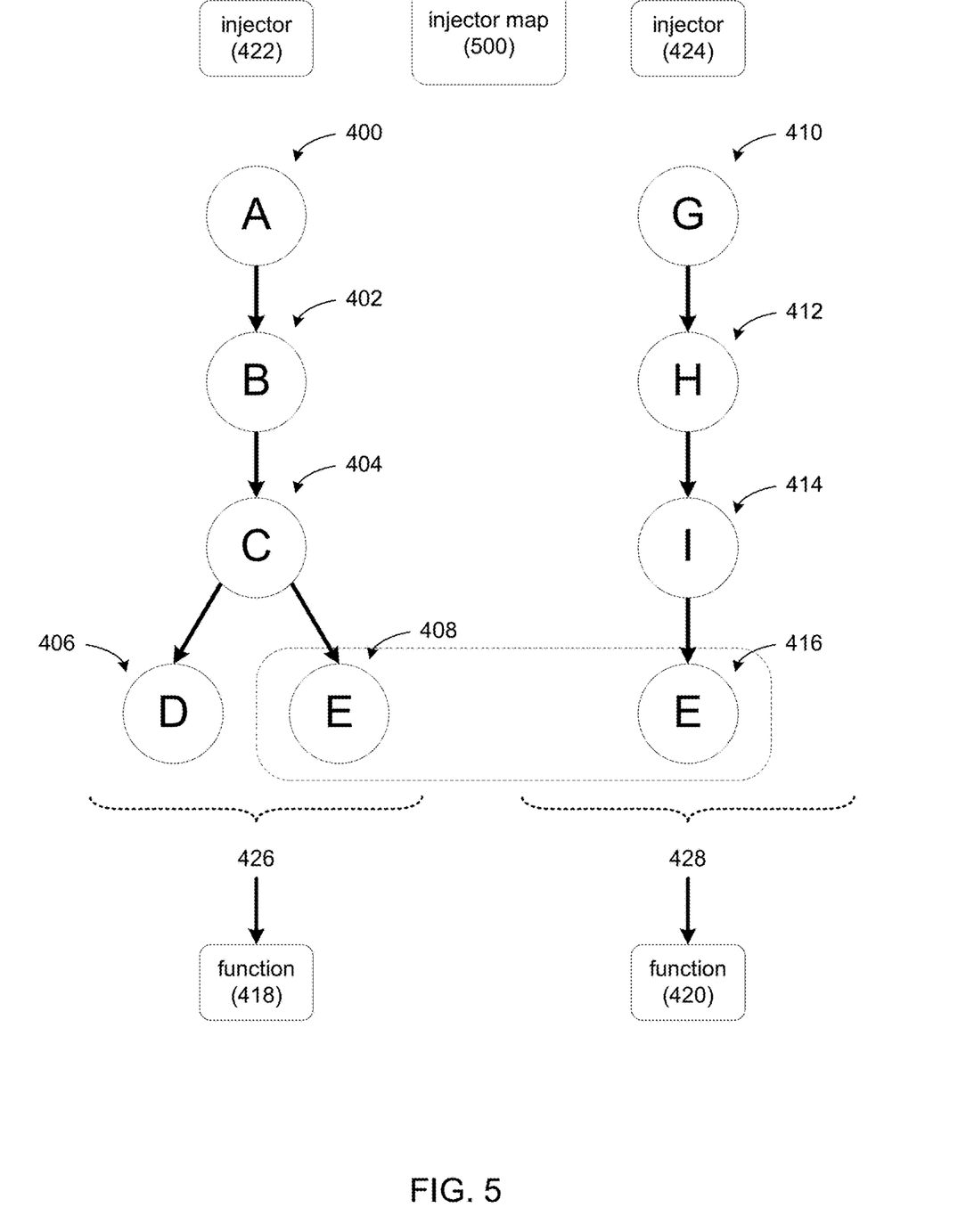

In some implementations, the plurality of dependency groups may be defined 300 based upon, at least in part, a priority associated with the execution of each dependency group. For example, suppose function 418 is associated with application initialization and that function 420 is associated with general data processing by the application. Referring also to FIG. 5, suppose that object E is a common object to both function 418 and function 420. However, further suppose that the user determines that object E is too expensive to graph before performing the functionality of function 418. For example, given the priority associated with executing function 418, a user may determine that function 418 is able to provide a minimal level of required functionality (e.g., functionality of objects A, B, C, and D) without instantiating object E immediately (e.g., within a predefined period of time).

Accordingly, application initialization process 10 may allow a user to define 300 each dependency group (e.g., dependency groups 426, 428) with at least one common object (e.g., common object E) with different modules (e.g., modules 408 and 416) for instantiating the at least one common object (e.g., object E). For example, application initialization process 10 may allow a user to define 300 (e.g., via a user interface) objects A, B, C, D, and E instantiated by modules 400, 402, 404, 406, 408, respectively as a priority dependency group (e.g., dependency group 426) and objects G, H, I, and E instantiated by modules 410, 412, 414, 416 as a main dependency group (e.g., dependency group 428). Accordingly, application initialization process 10 may instantiate the objects of the priority dependency group (e.g., dependency group 426) before instantiating the objects of the main dependency group (e.g., dependency group 428).

As will be discussed in greater detail, module 408 may be used by the first dependency group (e.g., dependency group 426) with a reference to the injector (e.g., injector 424) of the second dependency group (e.g., dependency group 428) to instantiate object E when module 416 of second dependency group 428 is processed. In this manner, application initialization process 10 may satisfy the requirements of DI frameworks by validating the dependency graph of a first dependency group with references to an injector of a different dependency group for the at least one common module while avoiding the resources and/or time required to fully process the at least one common object (e.g., object E).

Accordingly, application initialization process 10 may allow module 408 to be processed without holding up the instantiation of objects A, B, C, and D. In this example, object E may be instantiated at a later time with the processing of module 416 of dependency group 428.

In some implementations, application initialization process 10 may identify 302 one or more injectors associated with the one or more common objects. As discussed above, an injector may generally include a class that takes a set of modules as an input, builds an object graph from them, and provides an application programming interface (API) for creating instances of arbitrary classes. Accordingly, application initialization process 10 may identify 302 one or more injectors (e.g., injectors 422, 424) associated with the one or more common objects (e.g., object E). In this example, injector 422 may be generally configured to inject objects (e.g., objects A, B, C, D, and E) into function 418 of application 126, while injector 424 may be generally configured to inject objects (e.g., objects G, H, I, and E) into function 420 of application 126.

In some implementations, application initialization process 10 may generate 308 an injector map with the one or more injectors associated with the one or more common objects. An injector map may generally include a mapping of all dependency group names to the injector created for that dependency group. Referring again to FIG. 5, application initialization process 10 may generate 308 injector map 500 by mapping dependency group 426 to injector 422 and dependency group 428 to injector 424. As will be discussed in greater detail below, application initialization process 10 may utilize injector map 500 to provide a reference to an injector of a different dependency group for the at least one common object. In this manner, application initialization process 10 may validate an object graph generated for a particular dependency group by providing a reference to an injector of a different dependency group that will instantiate the at least one common object at a later time. Accordingly, application initialization process 10 may allow function 418 of application 126 to be utilized more quickly by deferring the processing of certain common objects for a different function (e.g., function 420).

In some implementations, application initialization process 10 may process 304 a first dependency group with at least one common object of the one or more common objects. Processing 304 a first dependency group may include the generation of a dependency graph for the first dependency group. Referring again to FIG. 5, application initialization process 10 may receive a request to perform one or more functions (e.g., functions 416, 418) of an application (e.g., application 126). For example, application initialization process 10 may receive a request to initialize or start application 126. In this example, application initialization process 10 may utilize a list of dependency groups to determine a processing order for the plurality of dependency groups. As discussed above, application initialization process 10 may determine that dependency group 426 has a higher execution priority than dependency group 428. Accordingly, application initialization process 10 may process the first dependency group (e.g., dependency group 426) before processing the second dependency group (e.g., dependency group 428).

Processing 304 the first dependency group with at least one common object of the one or more common objects may include generating 310 a dependency graph for the first dependency group. Generating 310 the dependency graph for the first dependency group (e.g., dependency group 424) may include processing or validating each module of the first dependency group to determine whether the injector (e.g., injector 420) is able to instantiate the one or more objects associated with the plurality of modules of the first dependency group. For example and as discussed above, when using a reflection-based DI framework, the entire object graph (e.g., dependency graph) may be built at the point the dependency group is initialized (e.g., typically during application startup), in order to validate that there are no objects in the dependency graph that the DI framework is not able to construct.

Referring again to the example of FIG. 5, application initialization process 10 may process 304 the first dependency group (e.g., dependency group 424) by generating 310 a dependency graph for dependency group 424. For example, application initialization process 10 may process 304 each module (e.g., modules 400, 402, 404, 406, 408) to determine or validate that application initialization process 10 is able to construct each object (e.g., objects A, B, C, D, and E). In this example, application initialization process 10 may generate 312 the dependency graph to determine the dependencies required to instantiate each object associated with the plurality of modules (e.g., modules 400, 402, 404, 406, 408) of the first dependency group (e.g., dependency group 424). Specifically, application initialization process 10 may generate 310 a dependency graph as shown in FIG. 5 showing that object A (as described by module 400) is dependent upon object B (as described by module 402); that object B is dependent upon object C (as described by module 404); that object C is dependent upon objects D and E (as described by modules 406 and 408, respectively).

As described above, suppose that generating the dependency graph for object E requires significant time and/or resources and that object E is common to another dependency group (e.g., dependency group 426). As will be described in greater detail below, instead of generating 310 the entire dependency graph that includes the dependencies of object E, application initialization process 10 may process a reference to an injector associated with object E from a different dependency group (e.g., dependency group 426) for deferred processing of object E.

In some implementations and for each common object of the first dependency group, application initialization process 10 may generate 306 a reference to an injector associated with the respective common object from a different dependency group for deferred processing of the respective common object. For example and as discussed above, various objects of a dependency group may require substantial time and/or resources to generate the dependency graph. Accordingly, application initialization process 10 may utilize "lazy injection" to provide or generate a reference to an injector of a different dependency group for deferred processing of the common object.

Continuing with the above example, application initialization process 10 may generate 306 a reference (e.g., reference 600 shown as module 408 in dashed lines in FIG. 6) to an injector of a different dependency group (e.g., injector 424 of dependency group 428). A reference to an injector may be referred to a "factory class". As discussed above, a factory class may be configured to create an instance of an object by going to the injector map and identifying the injector for the different dependency group that shares the common object. When processed, the reference to the injector may fetch the instance of the object from the referenced injector. Accordingly, the reference to the injector will satisfy the DI framework when it processes the modules, even though the reference to the injector may not actually instantiate the object when initially processed.

Figure 6:
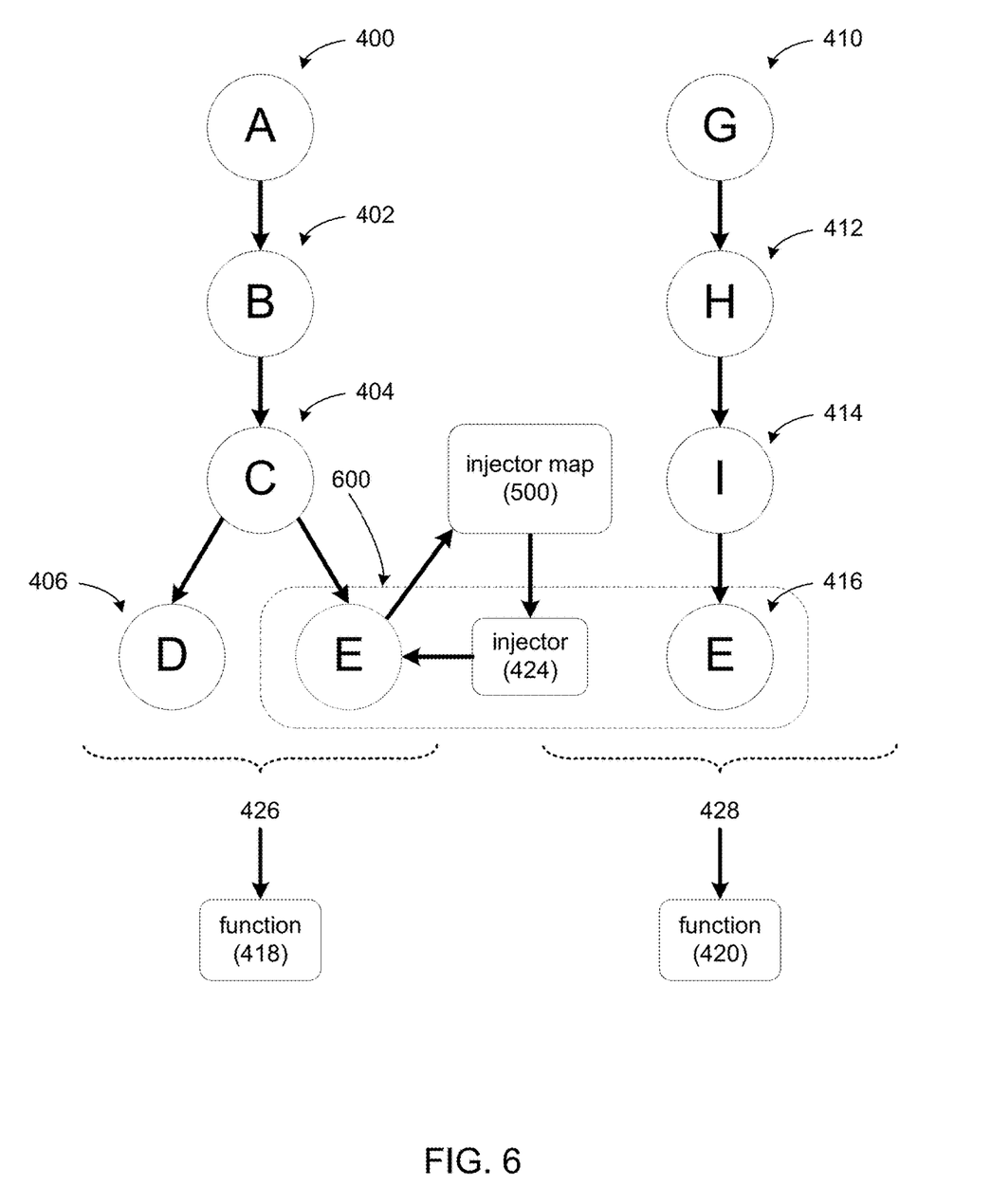

Continuing with the above example, suppose application initialization process 10 is generating the dependency graph for the first dependency group (e.g., dependency group 426). Application initialization process 10 may inject the reference to the injector (e.g., reference 600) for module 408 and may continue processing the dependency graph. Accordingly, application initialization process 10 may validate that each module of the first dependency group (e.g., modules 400, 402, 404, 406, 408) may be processed without having to generate the entire dependency graph for module 408. In this manner, application initialization process 10 may decrease the time required to instantiate the objects associated with the first dependency group (e.g., dependency group 426).

Generating 304 a reference to an injector associated with the respective common object of a different dependency group for deferred processing of the respective common object may include generating 312 the dependency graph for the at least one common object when processing the second dependency group with the at least one common object. For example and as discussed above, application initialization process 10 may determine that processing of the at least one common object (e.g., object E) may be deferred until the second dependency group (e.g., dependency group 428) is processed. Accordingly, application initialization process 10 may allow the dependency graph for first dependency group to be completed even though the dependency graph does not include the processing of the common object (e.g., object E).

Processing 304 the first dependency group with at least one common object of the one or more common objects may include instantiating 314 one or more objects associated with each module of the first dependency group. Instantiating 314 the one or more objects associated with each module of the first dependency group (e.g., dependency group 426) may include utilizing an injector (e.g., injector 422) to inject the objects (e.g., objects A, B, C, D) into the function (e.g., function 418) of the application (e.g., application 126). As discussed above, suppose that application initialization process 10 determines that objects A, B, C, D are needed to provide certain functionality within application 126. In this example, application initialization process 10 may instantiate 314 objects A, B, C, D with injector 422 while deferring the instantiation of object E until dependency group 428 is processed. In this manner, application initialization process 10 may provide the desired functionality of function 418 without compromising the requirements of the DI framework.

Processing 304 the first dependency group with at least one common object of the one or more common objects may include instantiating 316 the at least one common object when processing the second dependency group with the at least one common object. Continuing with the above example, application initialization process 10 may instantiate objects A, B, C, and D by processing modules 400, 402, 404, 406 with injector 422. However, because module 408 includes a reference to an injector (e.g., reference 600) of a different dependency group (e.g., dependency group 426), application initialization process 10 may instantiate 316 object E when processing dependency group 428 with injector 424. Accordingly, application initialization process 10 may utilize the reference to the injector (e.g., reference 600) within the first dependency group (e.g., dependency group 428) to defer the instantiation of the at least one common object (e.g., object E) until the second dependency group (e.g., dependency group 428) is processed.

In some implementations, application initialization process 10 may process 318 a second dependency group subsequently to the processing of the first dependency group. Continuing with the above example and referring also to FIG. 7, suppose that application initialization process 10 completes the processing of the first dependency group (e.g., dependency group 426). Application initialization process 10 may then process the next dependency group of the plurality of dependency groups (e.g., dependency group 428). As discussed above, application initialization process 10 may process 318 the second dependency group (e.g., dependency group 428) by generating the dependency graph for the second dependency group. For example, application initialization process 10 may process 318 each module (e.g., modules 410, 412, 414, 416) to determine or validate that application initialization process 10 is able to construct each object (e.g., objects G, H, I, and E).

Figure 7:
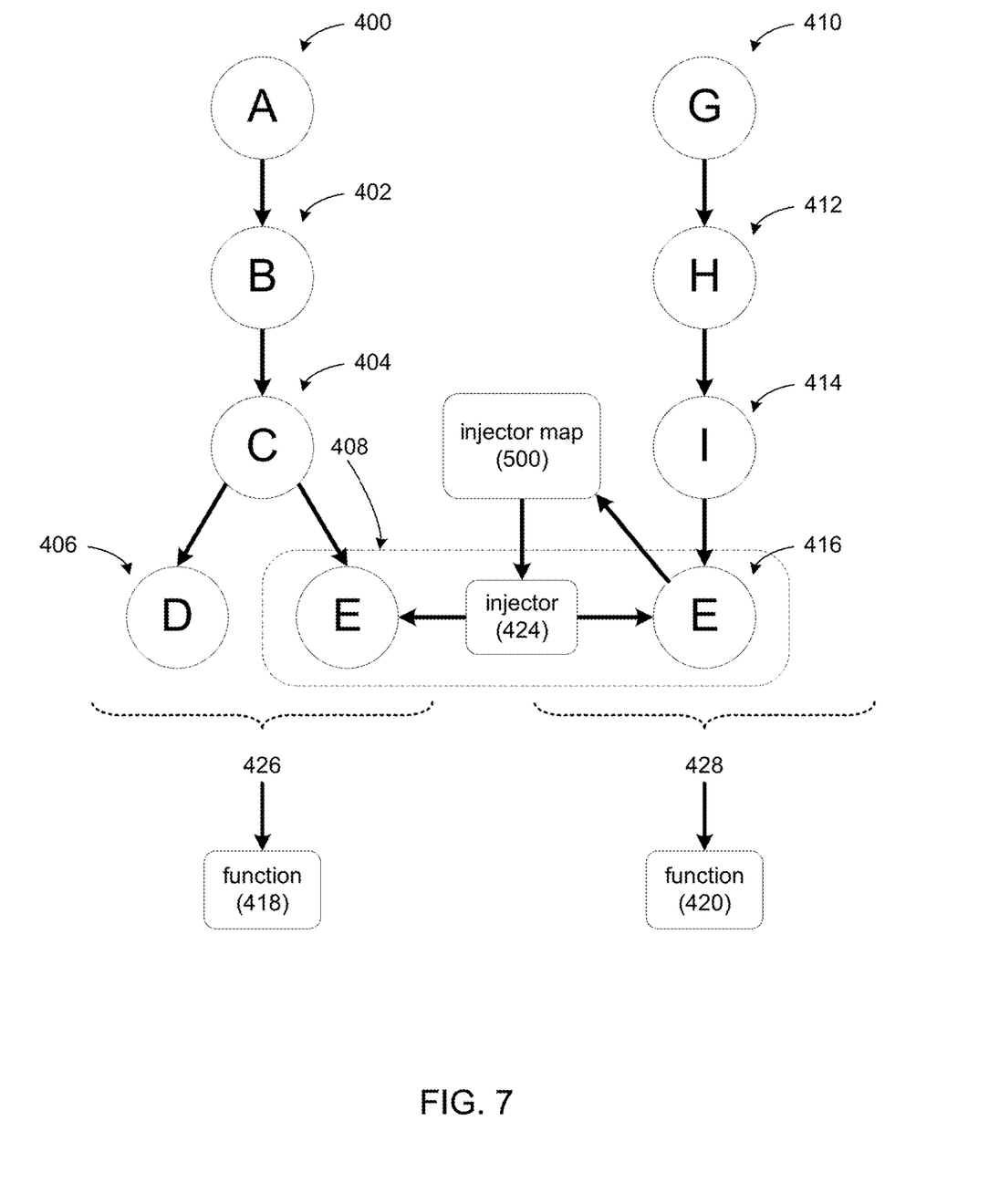

In this example, application initialization process 10 may generate the dependency graph to determine the dependencies required to instantiate each object associated with the plurality of modules (e.g., modules 410, 412, 414, 416) of the second dependency group (e.g., dependency group 428). Specifically, application initialization process 10 may generate a dependency graph as shown in FIG. 7 showing that object G (as described by module 410) is dependent upon object H (as described by module 412); that object H is dependent upon object I (as described by module 414); and that object I is dependent upon object E (as described by module 416). When processing module 416, application initialization process 10 may generate the dependency graph for object E.

Application initialization process 10 may process 318 the second dependency group (e.g., dependency group 428) by instantiating 316 the one or more objects associated with the at least one common object when processing the second dependency group with the at least one common object. For example, application initialization process 10 may process module 416 of dependency group 428 with injector 424 to instantiate object E. Application initialization process 10 may utilize reference to the injector (e.g., reference 600) to instantiate object E in function 416 using module 416 of dependency group 428.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
defining, a plurality of dependency groups for one or more objects of an application, wherein at least two dependency groups of the plurality of dependency groups include one or more common objects and wherein each dependency group of the plurality of dependency groups are defined based upon, at least in part, at least one common object of the one or more common objects with different modules for instantiating the at least one common object and a priority associated with an execution of each dependency group of the plurality of dependency groups;

identifying one or more injectors associated with the one or more common objects;

processing a first dependency group with the at least one common object of the one or more common objects;

instantiating the one or more objects associated with the first dependency group;

processing a second dependency group subsequently to the processing of the first dependency group;

instantiating the at least one common object when processing the second dependency group with the at least one common object; and for each common object of the first dependency group, generating a reference to an injector associated with a respective common object from a different dependency group for deferred processing of the respective common object.

2. The computer-implemented method of claim 1, further comprising:

generating an injector map with the one or more injectors associated with the one or more common objects.

3. The computer-implemented method of claim 1, wherein processing a first dependency group with at least one common object of the one or more common objects includes:

generating a dependency graph for the first dependency group.

4. The computer-implemented method of claim 3, wherein generating a reference to an injector associated with the respective common object of a different dependency group for deferred processing of the respective common object includes:

generating the dependency graph for the at least one common object when processing the second dependency group with the at least one common object.

5. A computer program product residing on a non-transitory computer readable medium having a plurality of instructions stored thereon which, when executed by a processor, cause the processor to perform operations comprising:

defining, a plurality of dependency groups for one or more objects of an application, wherein at least two dependency groups of the plurality of dependency groups include one or more common objects and wherein each dependency group of the plurality of dependency groups are defined based upon, at least in part, at least one common object of the one or more common objects with different modules for instantiating the at least one common object and a priority associated with an execution of each dependency group of the plurality of dependency groups;

identifying one or more injectors associated with the one or more common objects;

processing a first dependency group with the at least one common object of the one or more common objects;

instantiating the one or more objects associated with the first dependency group;

processing a second dependency group subsequently to the processing of the first dependency group;

instantiating the at least one common object when processing the second dependency group with the at least one common object; and for each common object of the first dependency group, generating a reference to an injector associated with a respective common object from a different dependency group for deferred processing of the respective common object.

6. The computer program product of claim 5, wherein the operations further comprise:

generating an injector map with the one or more injectors associated with the one or more common objects.

7. The computer program product of claim 5, wherein processing a first dependency group with at least one common object of the one or more common objects includes:

generating a dependency graph for the first dependency group.

8. The computer program product of claim 7, wherein generating a reference to an injector associated with the respective common object of a different dependency group for deferred processing of the respective common object includes:

generating the dependency graph for the at least one common object when processing the second dependency group with the at least one common object.

9. A computing system comprising:

a memory; and a processor configured to define a plurality of dependency groups for one or more objects of an application, wherein at least two dependency groups of the plurality of dependency groups include one or more common objects, wherein each dependency group of the plurality of dependency groups are defined based upon, at least in part, at least one common object of the one or more common objects with different modules for instantiating the at least one common object and a priority associated with an execution of each dependency group of the plurality of dependency groups, wherein the processor is further configured to identify one or more injectors associated with the one or more common objects, wherein the processor is further configured to process a first dependency group with the at least one common object of the one or more common objects, instantiate the one or more objects associated with the first dependency group;

process a second dependency group subsequently to the processing of the first dependency group;

instantiate the at least one common object when processing the second dependency group with the at least one common object; and wherein the processor is further configured to, for each common object of the first dependency group, generate a reference to an injector associated with a respective common object from a different dependency group for deferred processing of the respective common object.

10. The computing system of claim 9, wherein the processor is further configured to:

generate an injector map with the one or more injectors associated with the one or more common objects.

11. The computing system of claim 9, wherein processing a first dependency group with at least one common object of the one or more common objects includes:

generating a dependency graph for the first dependency group.

12. The computing system of claim 11, wherein generating a reference to an injector associated with the respective common object of a different dependency group for deferred processing of the respective common object includes:

generating the dependency graph for the at least one common object when processing the second dependency group with the at least one common object.

* * * * *